Aug. 27, 1963  M. A. PRICE  3,101,921
INFLATABLE AND DEFLATABLE EXTERNAL AIRCRAFT FUEL TANK
Filed March 30, 1962  4 Sheets-Sheet 1
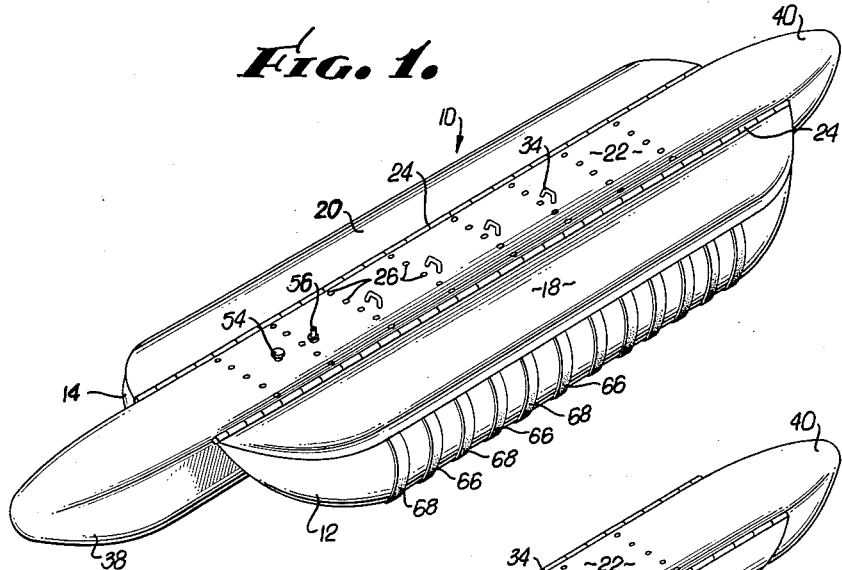
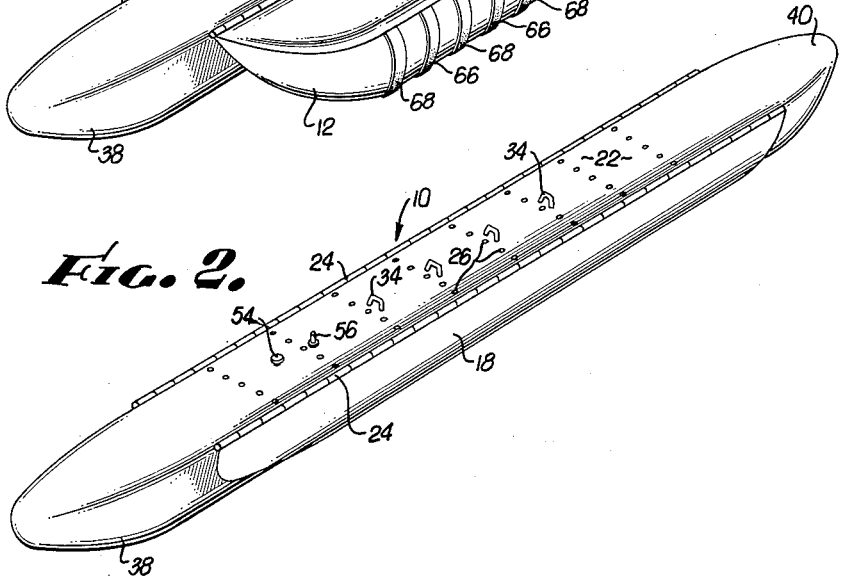
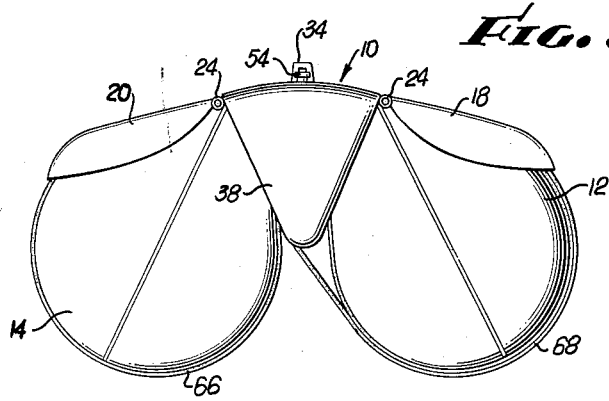
INVENTOR.
MARTIN A. PRICE
BY
Huebner & Worrel
ATTORNEYS.

Aug. 27, 1963   M. A. PRICE   3,101,921
INFLATABLE AND DEFLATABLE EXTERNAL AIRCRAFT FUEL TANK
Filed March 30, 1962   4 Sheets-Sheet 2
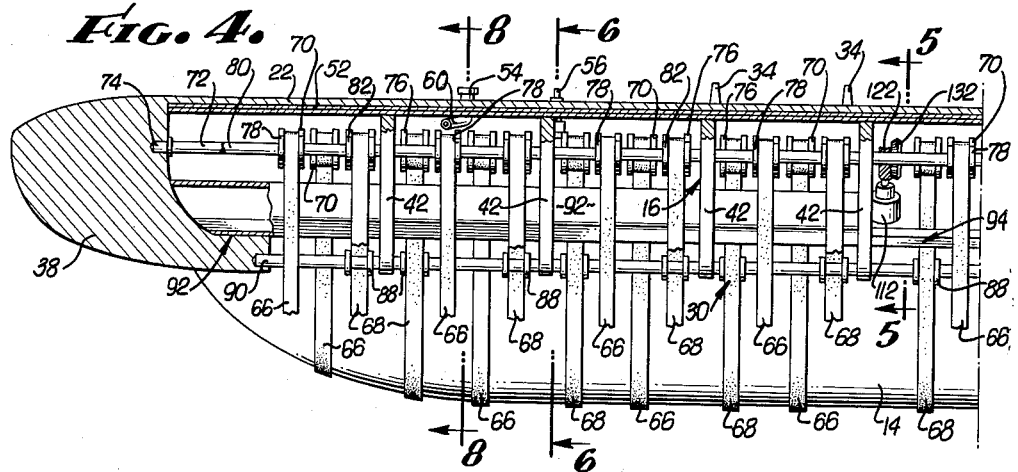
INVENTOR.
MARTIN A. PRICE
BY
Huebner & Worrel
ATTORNEYS.

Aug. 27, 1963         M. A. PRICE         3,101,921
INFLATABLE AND DEFLATABLE EXTERNAL AIRCRAFT FUEL TANK
Filed March 30, 1962                           4 Sheets-Sheet 3
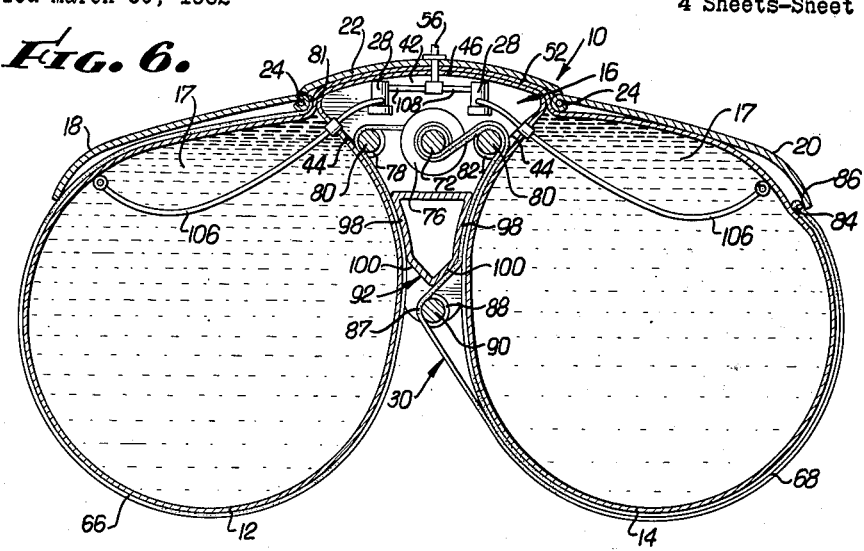
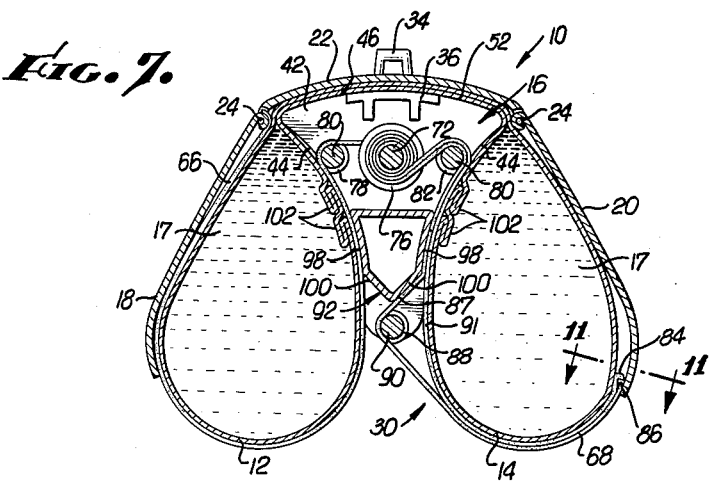
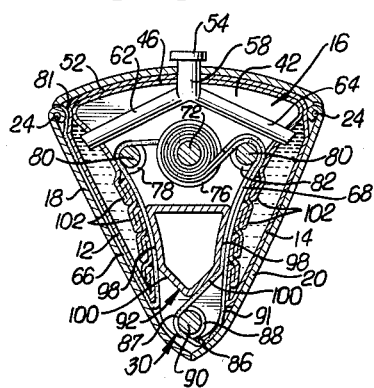
INVENTOR.
MARTIN A. PRICE
BY
Huebner & Worrel
ATTORNEYS.

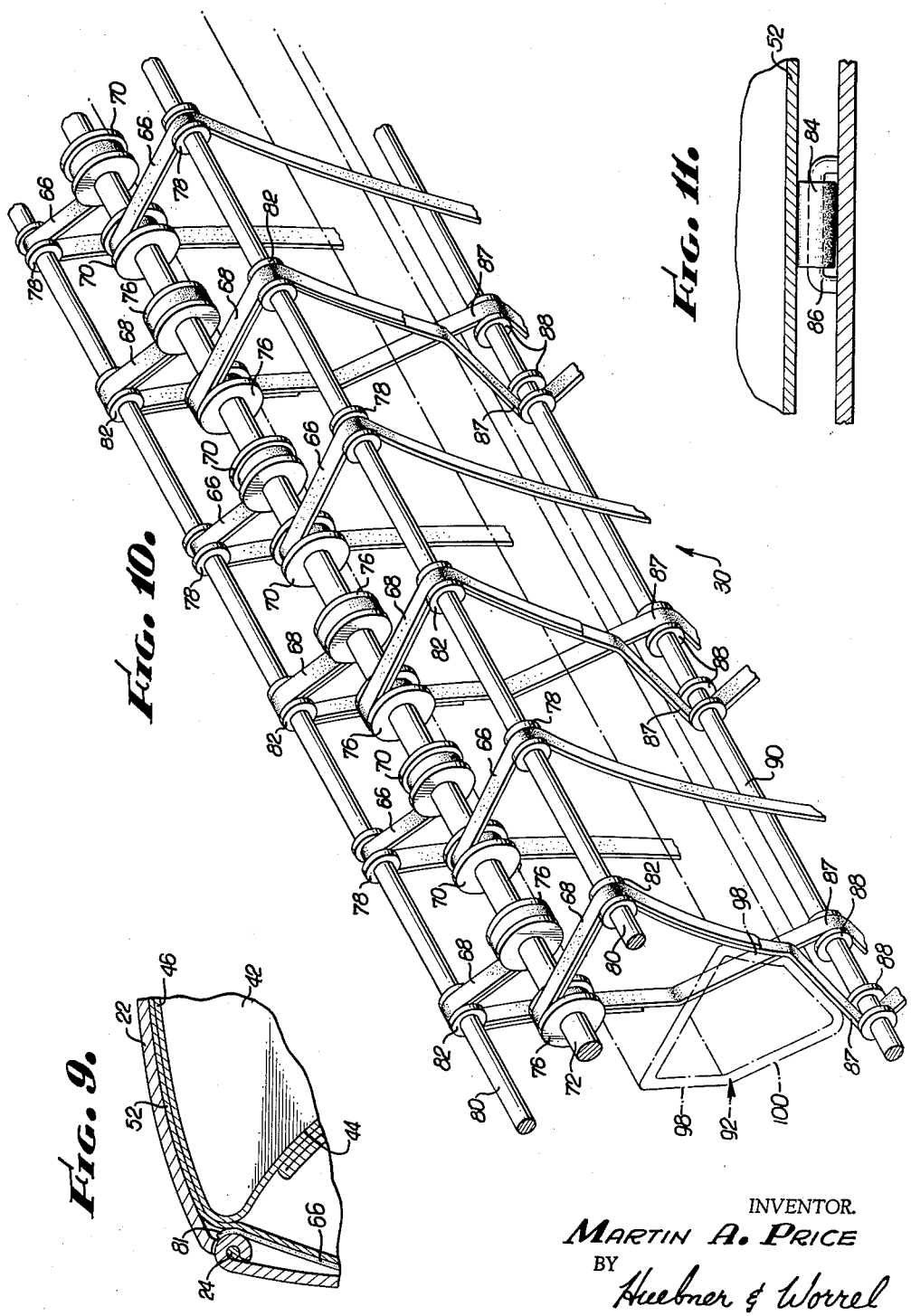

United States Patent Office 3,101,921
Patented Aug. 27, 1963

3,101,921
INFLATABLE AND DEFLATABLE EXTERNAL
AIRCRAFT FUEL TANK
Martin A. Price, 514 N. Helberta Ave.,
Redondo Beach, Calif.
Filed Mar. 30, 1962, Ser. No. 183,816
17 Claims. (Cl. 244—135)

This invention relates to fuel tanks for aircraft, and more particularly to fuel tanks which include expandable and contractible fuel cells, and which may be carried externally on the aircraft.

Although a relatively large variety of auxiliary aircraft fuel tanks are available, which generally are carried suspended under the wings of aircraft, there is need for an auxiliary fuel tank having flexible fuel cells. Flexible fuel cells which are a part of the fuel tank of the present invention include several herinafter numbered features and evolving from the numbered features are a plurality of hereinafter lettered features. (1) Expansion of the cells occurs when fuel is introduced thereinto, and in the event a plurality of cells are used fuel delivery conduits uniformly distribute the fuel in the fuel cells substantially simultaneously. (2) Consumption or transferring of fuel from the fuel cells to a selected destination results in the fuel cells being substantially continually mechanically contracted by a motorized strap or sling assembly to reduce the volume thereof to: (a) provide fuel cells which substantially always function as full, and functioning as full, ram air pressure and aircraft maneuvers will not substantially effect the fuel cells, (b) prevent surging of the fuel within the cells and thus provide a constant center of gravity, (c) prevent the formation of air pockets, and thus prevent the formation of an explosive mixture, (d) continually reduce aerodynamic drag, (e) gather the flexible material of the contracting fuel cells in such a manner during the consumption of fuel, that folds will be located in a region not exposed to the airflow, and (f) prevent pitching and yawing movement of the cells. (3) Fully contracted fuel cells provide a fuel tank which may be fully assembled and densely packaged for shipment, and being assembled, preliminary assembling of the fuel tank before use is unnecessary. (4) Transferring of the fuel from the fuel tank to a selected destination may be achieved in two possible ways: (a) by using fuel pumps, or (b) by using the motorized sling assembly to squeeze the fuel out of the fuel cells.

It is an object of this invention to provide an auxiliary fuel tank for aircraft which includes expandable and contractible flexible fuel cells and cooperating structure which will achieve the preceding itemized features, results and advantages.

Further objects and advantages of this invention will appear during the course of the following part of this specification wherein the details of construction and mode of operation of a preferred embodiment is described with reference to the accompanying drawings, in which:

FIG. 1 is a perspective view illustrating the aircraft fuel tank of the present invention showing the flexible fuel cells full of fuel and in an expanded condition;

FIG. 2 is a perspective view similar to FIG. 1, but illustrating the fuel cells empty and in the contracted condition;

FIG. 3 is a front elevational view illustrating the configuration of the fuel tank when the cells are full of fuel;

FIG. 4 is a longitudinal, vertical sectional view of the forward end of the fuel tank illustrating a sling assembly for supporting and contracting a fuel cell;

FIG. 4a is a continuation of FIG. 4, showing the sling assembly as applied to the rear end of the fuel tank;

FIG. 5 is an enlarged sectional view taken on line 5—5 of FIG. 4, illustrating a switch and motor facility for actuating the sling assembly to effect contracting the fuel cells as the fuel is consumed;

FIG. 6 is a sectional view taken on line 6—6 of FIG. 4, illustrating the arrangement for transferring fuel from full fuel cells;

FIG. 7 is a sectional view taken on line 7—7 of FIG. 4, but illustrating the reduced volume of the fuel cells as contrasted with FIG. 6, due to partial consumption of fuel and showing the arrangement of the folds of the fuel cells;

FIG. 8 is a sectional view taken on line 8—8 of FIG. 4, but showing the fuel cells in the completely contracted condition and illustrating the structure employed to deliver fuel to the fuel cells;

FIG. 9 is an enlarged, fragmentary and detailed view showing the position of one end of certain of the straps used to contract and support the fuel cells;

FIG. 10 is a schematic, perspective view looking generally from front to rear illustrating the sling assembly for a pair of flexible fuel cells; and FIG. 11 is an enlarged, sectional view taken on line 11—11 of FIG. 7.

Referring, initially, to FIGS. 1, 2 and 3, there is to be seen a jettisonable aircraft fuel tank 10 which comprises preferably a pair of generally cylindrical fuel cells 12 and 14 fabricated of a flexible polyurethane elastomer material known as "Estane." However, other flexible materials which are not particularly elastic are entirely applicable, such as some types of rubber coated fabric. The polyurethane elastomer material displays certain properties which are particularly applicable for use on flexible fuel cells; it can be calendered, heated, vacuum formed over a mold, seam welded, it has a very high tensile strength, is highly resistant to punctures and abrasions, and aging of the material is not readily apparent.

The fuel cells are draped over a supporting structure 16, and inflation or expansion of the fuel cells is accomplished by introducing fuel 17 thereinto. Expansion of the fuel cells from the low drag aerodynamic configuration shown in FIG. 2 to the condition shown in FIGS. 1 and 3, results in clam shell doors 18 and 20 being spread from the closed condition where the cells are fully enclosed to the open condition where the doors rest on the expanded fuel cells. The clam shell doors are connected to an elongated cover 22 by piano hinges 24, and the cover is connected to the supporting structure 16 by fasteners 26. With the fuel tank 10 in the low drag configuration the aircraft may readily land with the fuel cells still exteriorly attached to the aircraft.

Deflation or contraction of the fuel cells is achieved when fuel is transferred therefrom by fuel transfer pumps 28, FIGURE 6. If the fuel pumps malfunction a sling assembly 30, best seen in schematic FIG. 10, and motor unit 32, best seen in FIG. 5, may be used to effect transferring of the fuel. The strap or sling assembly 30 performs several functions, two of which are: (1) it firmly supports or cradles the fuel cells in the air stream, and (2) it constricts or contracts the fuel cells as the fuel is transferred to reduce the volume. However, when fuel is being introduced into the fuel cells 12 and 14, the motor unit 32 is not energized and the sling assembly, therefore, does not interfere with the expansion of the fuel cells as will hereinafter be described in greater detail.

As the sling assembly 30 reduces the volume of the fuel cells when fuel is being transferred: (1) the fuel cells, although having a reduced volume, function as full, and functioning as full, ram air pressure and violent as well as gentle aircraft maneuvers will not substantially affect the fuel cells, (2) the formation of air pockets is prevented and the mixing of air with the fuel to produce an explosive mixture in the fuel cells is prevented, (3) the aerodynamic drag of the fuel tank 10 is continually reduced which contributes to better performance of the aircraft, (4) the surging of fuel within the fuel cells is prevented and thus a substantially constant center of gravity is maintained, and (5) the flexible material of the fuel cells is gathered in folds, arranged and located so as to not interfere with the performance of the aircraft. The structure which contributes to the itemized features will hereinafter be considered in greater detail.

The fuel tank 10 is preferably carried suspended from the wing of an aircraft, but it has been found that the fuel tank may also be suspended from a strategic location on the exterior of the aircraft fuselage. In axial alignment on the cover 22 are a plurality of hooks 34 which are employed for suspending the fuel tank in the chosen location. To resist the strains imposed on the hooks which occur as a result of the weight of the fuel tank and the fuel therein, the airstream and the maneuvers performed by the aircraft, a hook reinforcement 36 is provided for each hook, see FIG. 7.

The supporting structure 16 employed to support the fuel cells 12 and 14, the sling assembly 30, and the motor unit 32 comprise a rigid forward end 38 and a rigid tail end 40 each of which has a low drag airfoil configuration. Disposed between the forward end and the tail end are a plurality of equally spaced partitions or bulkheads 42 each of which has generally a triangular shape with concave sides 44, and a base 46, the shape of the base being complementary to the shape of the cover 22. The concave sides have a conformation which is generally complementary to the fuel cells when the latter contain fuel and when containing fuel, the sling assembly 30 continually urges the fuel cells 12 and 14 into nesting engagement with the concave sides. It is to these bulkheads 42 that the cover 22 is attached by fasteners 26, FIG. 5. When the fuel cells are empty the concave sides provide storage space so that the clam shell doors 18 and 20 may be closed to completely enclose the fuel cells and provide the low drag configuration of FIG. 2.

The fuel cells 12 and 14 are connected together by an elongated web 52 which is interposed between the base 46 of each bulkhead and the cover 22. Strain on the web imposed thereon by fuel 17 in the fuel cells 12 and 14 is relieved by the sling assembly 30 in a manner to be hereinafter described in greater detail. The only penetration of the web is by fasteners 26, hooks 34, a fuel filler pipe 54 and a fuel transfer line 56.

Fuel 17 is introduced into each fuel cell 12 and 14 through the fuel filler pipe 54. Subjacent to a neck 58 of the filler pipe 54 is a forwardly and downwardly-extending conduit portion 60, FIG. 4, and integral with conduit portion 60 are branch conduits 62 and 64 which extend into fuel cells 12 and 14, respectively, FIG. 8. With this construction of the fuel supply system for the fuel cells, a uniform distribution of fuel into the fuel cells is achieved at the time of filling.

Cradling or supporting of the expanded fuel cells is achieved by the sling assembly 30 which includes a plurality of straps or slings 66 and 68 which preferably are in equally-spaced relationship and which are preferably alternately arranged. The straps or slings may be made of nylon or of any other suitable flexible material. There is a set of slings 66 and a set of slings 68 for each fuel cell 12 and 14, and the combination of a set of slings 66 and a set of slings 68 for each fuel cell will hereinafter be referred to as a group. Slings 66 are adapted to support and lift the respective fuel cell as the fuel is transferred, and slings 68 have a dual purpose: (1) they lift and support the respective fuel cell as the fuel is being transferred and (2) they substantially simultaneously pull the fuel cell into the concave sides 44 of bulkheads 42. One end of each strap 66, which is of single thickness, is wrapped about and firmly attached to a spool 70 which is rigidly mounted on a rotatable elongated shaft 72, the forward end 74 of the shaft being supported by the forward end 38 of the fuel tank, and the rear end of the shaft, not shown, being supported by the tail end 40 of the fuel tank. Support for shaft 72 between the forward end 38 and the tail end 40 is provided by bulkheads 42. Although a single shaft 72 is illustrated, it is to be understood that instead of a single shaft a plurality of rotatable shafts may be used, and the most effective use of a plurality of shafts would occur when a motor unit 32 for each shaft is employed.

Straps or slings 68 are each of separable double thickness and therefore a pair of ends of each sling 68 are wrapped about and attached to a spool 76 rigidly mounted on shaft 72, there being a spool 76 for each sling 68. Spools 70 may be of differing diameters in order that certain slings 66 may be fed onto the spools at a more rapid rate than other slings, and spools 76 may be of differing diameters to accommodate slings 68 for the same reason.

Each sling 66 in the left-hand set, as viewed in FIG. 10, feeds off and on the bottom of the respective spool 70 and each sling 66 in the right-hand set feeds off and on the top of the respective spool 70. Each of the slings 66 is threaded over a corresponding idler roller 78 which is freely rotatable on an elongated support shaft 80, there being a pair of support shafts 80, one for each group of slings 66 and 68. Each support shaft 80 is supported in the same manner as shaft 72; i.e., by the forward end 38, the tail end 40 and bulkheads 42. From the respective idler rollers the slings 66 of each set substantially encircle the respective fuel cell in a manner to provide support for the fuel cell when expanded by fuel. Each of the slings 66 includes a terminal end 81 which is passed between the respective fuel cell and the respective piano hinge 24, and the terminal end is secured to either the respective piano hinge 24 or the cover 22 in any suitable conventional manner. Slings 66 are forced to conform to the conformation of the respective concave sides 44 by the expansion of fuel cells 12 and 14 for the purpose to be hereinafter recited.

Slings 68 in the left-hand set as viewed in FIG. 10, feed on and off spools 76 from the bottom, the same as the set of left-hand slings 66, and slings 68 in the right-hand set feed off and on spools 76 from the top, the same as the corresponding slings 66. Each sling 68 is threaded over an idler roller 82 which is freely rotatable on the respective support shaft 80. Expansion of fuel cells 12 and 14 also forces slings 68 to conform to the concave contour of sides 44.

Each sling 68 has a doubled free end 84 which is looped about a U-shaped hook 86 on the respective clam shell door, FIG. 11, and in this way the doors are prevented from being affected by the airstream and the maneuverings of the aircraft during the flight of the aircraft. Also, in this way the doors 18 and 20 are pulled to their closed position as the fuel cells are contracted. Unlike slings 66, slings 68 only partially encircle their respective fuel cell.

The slings 68 are each separated intermediate the ends thereof, with one portion 87 thereof being looped over an idler roller 88 which is freely rotatable on a single elongated shaft 90 which is located adjacent the apex formed by the convergence of sides 44, and which is in vertical alignment with shaft 72. Shaft 90 is also supported by the forward end 38, the tail end 40 and the bulkheads 42. Looping of portion 87 over idler roller 88 serves to pull each fuel cell into the concave sides 44 when the sling assembly 30 is actuated, and it is in this way that each set of slings 68 cooperate with each set of slings 66 to support the fuel cells, and it is also in this way that slings 68 prevent pitching and yawing of the fuel cells 12 and 14.

Portion 87 of each sling 68 is made to rejoin portion 91 of each sling 68 by a generally triangular shaped guide 92. A plurality of substantially identical guides are provided, and a single guide bridges the distance between each bulkhead 42 and the one immediately to the front or rear. However, one guide bridges the distance between the forward end 38 and the bulkhead 42 to the rear thereof, and another guide bridges the distance between the tail end 40 and the bulkhead 42 forward thereof. There is an additional guide 94 which bridges the distance between bulkhead 96, on which motor unit 32 is mounted and the bulkhead 42 to the rear thereof, bulkhead 96 being substantially identical to bulkheads 42. Guide 94 has smaller vertical dimensions than the other guides in order that adequate space may be available to securely mount motor unit 32 on bulkhead 96. The guides 92 and 94 shown are merely representative of many such structures which may achieve the purpose of guiding portions 87, and therefore the guides shown are not to be considered limitations. Each of the guides 92 and single guide 94 include concave sides 98, the curvature of the concavity thereof being substantially identical to the curvature of the concavity of sides 44. Subjacent to sides 98 on each guide are flat surfaces 100 which converge to produce the apex of the guides 92 and 94.

In controlling the direction of travel assumed when slings 68 feed on and off spools 76, the portions 87 engage flat surfaces 100 in the manner illustrated in FIGS. 6, 7 and 8, and the expanded fuel cells force the slings 68 to follow the contour of concave sides 98 of the guides and the concave sides 44 of the bulkheads 42. In this way, when each group of slings feed onto spools 70 and 76, respectively, the sling frictionally engage the flexible material of the respective fuel cell to produce an upwardly-directed pull which has the effect of producing a series of upwardly-directed folds 102, see FIGS. 7 and 8. The folds are nested against concave sides 44 of bulkheads 42 and therefore they are not affected by the airstream. With the folds 102 arranged as they are and in the location illustrated, the rest of the material of each fuel cell is substantially wrinkle free.

Feeding of the slings 66 and 68 onto rollers 70 and 76, respectively, is accomplished with the motor unit 32, when fuel transfer pumps 28 are energized to transfer fuel from the fuel cells 12 and 14, see FIGURE 6.

A fuel transfer or vacuum pump 28 is provided for each fuel cell 12 and 14, and the pumps are secured to a bulkhead 42. The location of the pumps is preferably in the region of the center of gravity of the fuel tank and the same applies to motor unit 32. Projecting into each fuel cell from the corresponding transfer pump is a flexible fuel suction line 106 through which substantially the entire quantity of fuel in the fuel cells may be withdrawn.

Each fuel transfer pump 28 is connected to the single fuel transfer line 56 by a fuel line 108. Fuel transfer pumps 28 transfer an equal quantity of fuel from each fuel cell in the same length of time with the result that the fuel cells are uniformly emptied. For instance, if the capacity of each fuel transfer pump 28 is one gallon per minute, each fuel cell will have one gallon of fuel withdrawn therefrom in one minute. If desired, a single fuel transfer pump may be connected so as to simultaneously pump fuel from both cells.

The motor unit is connected to a source of power, which is the present case is a storage battery 110, FIG. 5. One side of the storage battery is electrically connected to one terminal of a reversible motor 112, which is a part of motor unit 32, by a conductor 114. From the other terminal of motor 112 a conductor 116 extends to a suitable switch 119, and from switch 119 a conductor 120 returns to the other side of the storage battery 110.

The motor 112 drives a gear box 123 which includes an externally splined and rotatable shaft 121, and in sliding, splined engagement with shaft 121 is a rotatable, hollow worm 122. Connected with the worm is an elongated shaft 124, which is supported by a bearing 125 so as to be axially shiftable with the worm. The terminal end of shaft 124 includes an annular flange 126 which intermittently engages switch 119 to effect closing of the switch to feed the slings 66 and 68 onto the corresponding spools. Encircling shaft 124 and seating against the annular flange 126 and bearing 125 is a compression spring 128 which biases the flange 126 toward the switch 119. Worm 122 is in mating engagement with a worm gear 132 which is firmly mounted on shaft 72.

When the slings 66 and 68 are under maximum tension and the fuel cells 12 and 14 function as full, the worm 122 and annular flange 126 are in the lower or solid line position illustrated in FIG. 5, and the spring 128 is loaded. As fuel is transferred, tension in slings 66 and 68 is reduced sufficiently so that the spring 128 will move the worm 122 and shaft 124 upwardly to the phantom line position in FIG. 5 against the downward urging by worm gear 132, thus moving flange 126 into engagement with switch 119 to effect closing of the switch. Closing of switch 119 energizes motor 112 and causes worm 122 to rotate so as to rotate worm gear 132 clockwise as viewed in FIG. 5. This clockwise rotation of worm gear 132 in FIG. 5 effects feeding of the slings 66 and 68 onto the corresponding spools to reduce the volume of fuel cells 12 and 14. As the tension on the slings 66 and 68 increases due to the constriction of the fuel cells 12 and 14 by this take-up on the slings, rotation of the worm gear 132 is arrested by the slings so that further rotation of worm 122 by the motor causes the worm 122 to thread downwardly against gear 132, so that worm 122 and shaft 124 slide downwardly and away from switch 119, the effect being that the switch 119 is opened to de-energize motor 112. The worm 122 and all components attached thereto thus assume the solid line position illustrated in FIG. 5. This procedure is repeated until the clam shell doors 18 and 20 enclose the fuel cells 12 and 14, and the fuel cells are substantially entirely emptied.

When the fuel cells 12 and 14 are filled with fuel, the motor 112 is reversed to permit expansion of sling straps 66 and 68. In the alternative, instead of providing a reversible motor, a clutch connection between the worm gear 132 and shaft 72 (not shown) could be provided which would be disengaged when the fuel cells are filled.

Although a single switch 119 and a single motor 112 are illustrated, it is to be understood that a plurality of switches and motors may be employed and mounted on the bulkheads 42 in strategic locations. For example, motors and switches may be used to contract each fuel cell. Also, by locating a plurality of switches and motors along the entire length of the fuel tank, specific regions of the fuel cells may be contracted to effect a reduction in the volume of the fuel cells while other regions are not contracted. In this way the fuel cells will be contracted in the most effective and efficient manner.

In the event of total malfunction of both fuel pumps 28, the motor unit 32 may be energized by manually-operated switch 134 which is included in the circuit shown in FIG. 5, and which is located in the cockpit of the aircraft and operated by the pilot. Closing of switch 134 will result in feeding the slings onto the spools, and in this way the fuel is in effect squeezed out of the fuel cells and transferred through open fuel transfer line 56 to a selected destination.

A brief résumé of the operation of the fuel tank follows: The fuel cells 12 and 14 are uniformly expanded when fuel 17 is supplied thereto through fuel filler pipe 54. The motor unit 32 is reversed so the slings 66 and 68 which are substantially entirely rolled onto spools 70 and 76, respectively, freely feed off the spools and permit expansion of the fuel cells. Expansion of the fuel cells 12 and 14 results in opening of the clam shell doors 18 and 20.

As long as the fuel cells remain in firm nesting engagement against sides 44 and the slings 66 and 68 are under maximum tension, the switch 119 is open, but as soon as fuel is transferred from fuel cells 12 and 14, the spring 128 will force closure of switch 119 to energize the motor 112, and the fuel cells will be contracted and drawn into firm nesting engagement with the sides 44, to again place maximum tension on slings 66 and 68, and the switch 119 will be opened. This operation is continually repeated until the fuel cells are empty. As a result the fuel cells when full are substantially always in firm nesting engagement with the concave sides 44 of bulkheads 42, and since the slings 66 and 68 are substantially continually under tension, the fuel cells 12 and 14 are prevented from pitching and yawing.

The result of this repeated operation of energizing and de-energizing motor 112 results in the fuel cells substantially always functioning as full, and with the fuel cells always functioning as full, the itemized objects of the invention are fulfilled.

Malfunction of both fuel transfer pumps 28 will not prevent the transfer of fuel 17 from fuel cells 12 and 14. Manual switch 134 may be closed to energize the motor 112, and with the fuel transfer line 56 open, fuel may be squeezed from the fuel cells by feeding the slings 66 and 68 onto spools 70 and 76, respectively.

When the fuel cells 12 and 14 are substantially entirely empty, the clam shell doors are returned to their closed position which results in the fuel tank 10 having a low drag configuration.

While the instant invention has been shown and described herein in what is conceived to be the most practical and preferred embodiment, it is recognized that departures may be made therefrom within the scope of the invention, which is therefore not to be limited to the details disclosed herein but is to be accorded the full scope of the claims so as to embrace any and all equivalent devices.

What I claim is:

1. An aircraft fuel tank which comprises: a supporting structure having means thereon for releasably attaching said fuel tank to an external surface portion of an aircraft; an expandable and contractible fuel cell on said supporting structure, said fuel cell being expandable when fuel is introduced therein and contractible when fuel is withdrawn therefrom; and a motorized sling assembly on said supporting structure which comprises a motor; a shaft interconnected to said motor which is rotatable in one direction when fuel is introduced into said fuel cell and rotatable in the opposite direction when said motor is periodically energized; and slings which are connected to said shaft and which support said fuel cell, said slings being rolled upon said shaft when said motor is energized to contract said cell to reduce the volume thereof producing a fuel cell which consistently functions as full.

2. An aircraft fuel tank according to claim 1, wherein said supporting structure includes a storage recess in which said fuel cell is stored when substantially empty.

3. An aircraft fuel tank according to claim 1, wherein said supporting structure includes a hinged door which rests on said fuel cell when the fuel cell is expanded and encloses said fuel cell when the fuel cell is substantially empty.

4. An aircraft fuel tank which comprises: a supporting structure having means thereon for releasably attaching said fuel tank to an external surface portion of an aircraft; a pair of expandable and contractible fuel cells on said supporting structure, said fuel cells each being expandable when fuel is delivered thereto, and contractible when fuel is transferred therefrom; means for delivering fuel into said fuel cells; and a motorized sling assembly on said supporting structure which comprises a motor; a main shaft interconnected to said motor which is rotatable in one direction when fuel is introduced into said fuel cells and rotatable in the opposite direction when said motor is intermittently energized; and slings which are connected to said shaft and which support said fuel cells, there being a group of slings for each fuel cell, said slings being rolled upon said shaft when said motor is energized to contract said fuel cells to reduce the volume thereof producing fuel cells which consistently function as full.

5. An aircraft fuel tank according to claim 4, wherein said fuel cells are generally cylindrical and said supporting structure includes bulkheads having recessed sides to receive said expanded fuel cells in firm nesting engagement, and when said fuel cells are substantially empty said recessed sides provide storage space for said fuel cells.

6. An aircraft fuel tank according to claim 4, wherein said motorized sling assembly includes a switch for energizing said motor, means for closing said switch to energize said motor when fuel is being transferred from said fuel cells, and said means causing said switch to open when the fuel is substantially entirely distributed throughout said fuel cells and the fuel cells function as full.

7. An aircraft fuel tank which comprises: a supporting structure having means thereon for releasably attaching said fuel tank to an external surface portion of an aircraft; a pair of expandable and contractible fuel cells on said supporting structure, said fuel cells each being expandable when fuel is introduced therein, and contractible when fuel is transferred therefrom; means for delivering fuel into said fuel cells; means for uniformly transferring fuel from said fuel cells; and a motorized sling assembly on said supporting structure which comprises a motor; a shaft interconnected to said motor which it rotatable in one direction when fuel is delivered to said fuel cells and rotatable in the opposite direction when said motor is intermittently energized; and slings which are connected to said shaft and which support said fuel cells, there being a group of slings for each fuel cell, said slings being rolled upon said shaft when said motor is energized to contract said fuel cells to reduce the volume thereof producing fuel cells which consistently function as full.

8. An aircraft fuel tank which comprises: a supporting structure having means thereon for attaching said fuel tank to an aircraft; an expandable and contractible fuel cell on said supporting structure, said fuel cell being expandable when fuel is introduced therein and contractible when fuel is withdrawn therefrom; and a motorized sling assembly on said supporting structure which comprises a motor; a shaft interconnected to said motor which is rotatable in one direction when fuel is introduced into said fuel cell and rotatable in the opposite direction when said motor is periodically energized; and slings which are connected to said shaft and which support said fuel cell, said slings being rolled upon said shaft when said motor is energized to contract said cell to reduce the volume thereof producing a fuel cell which consistently functions as full, certain of said slings substantially encircling said fuel cell to support said fuel cell and when rolled upon the shaft lifting the fuel cell to effect contraction and a reduction of volume thereof, and certain other of said slings partially encircling said fuel cell and when rolled upon said shaft lifting the fuel cell while substantially simultaneously pulling the fuel cell into firm nesting engagement against said structure to prevent pitching and yawing of said fuel cell.

9. An aircraft fuel tank which comprises: a supporting structure having means thereon for attaching said fuel tank to an aircraft; an expandable and contractible fuel cell on said supporting structure, said fuel cell being expandable when fuel is introduced therein and contractible when fuel is withdrawn therefrom; and a motorized sling assembly on said supporting structure which comprises a motor; a shaft interconnected to said motor which is rotatable in one direction when fuel is introduced into said fuel cell and rotatable in the opposite direction when said motor is periodically energized; and slings which are connected to said shaft and which support said fuel cell, said slings being rolled upon said shaft when said motor is energized to contract said cell to reduce the volume thereof producing a fuel cell which consistently functions as full; said fuel cell being fabricated of a flexible material and said slings frictionally engaging said material when being rolled upon said shaft to produce folds in a region not affected by airstream and which leave the balance of the fuel cell substantially wrinkle free.

10. An aircraft fuel tank which comprises: a supporting structure having means thereon for attaching said fuel tank to an aircraft; an expandable and contractible fuel cell on said supporting structure, said fuel cell being expandable when fuel is introduced therein and contractible when fuel is withdrawn therefrom; and a motorized sling assembly on said supporting structure which comprises a motor; a shaft interconnected to said motor which is rotatable in one direction when fuel is introduced into said fuel cell and rotatable in the opposite direction when said motor is periodically energized; and slings which are connected to said shaft and which support said fuel cell, said slings being rolled upon said shaft when said motor is energized to contract said cell to reduce the volume thereof producing a fuel cell which consistently functions as full; said supporting structure including a hinged door which rests on said fuel cell when the fuel cell is expanded and encloses said fuel cell when the fuel cell is substantially empty, certain of said slings being connected to said hinged door and being employed to close said door as the volume of said fuel cell is reduced.

11. An aircraft fuel tank which comprises: a supporting structure having means thereon for attaching said fuel tank to an aircraft; a pair of expandable and contractible fuel cells on said supporting structure, said fuel cells each being expandable when fuel is delivered thereto, and contractible when fuel is transferred therefrom; means for delivering fuel into said fuel cells; and a motorized sling assembly on said supporting structure which comprises a motor; a main shaft interconnected to said motor which is rotatable in one direction when fuel is introduced into said fuel cells and rotatable in the opposite direction when said motor is intermittently energized; and slings which are connected to said shaft and which support said fuel cells, there being a group of slings for each fuel cell, said slings being rolled upon said shaft when said motor is energized to contract said fuel cells to reduce the volume thereof producing fuel cells which consistently function as full, said group of slings for each fuel cell including one set which lifts and contracts said fuel cell to reduce the volume thereof, and a second set which lifts and contracts said fuel cell to reduce the volume thereof while substantially simultaneously pulling said fuel cell into firm nesting engagement with said supporting structure to prevent pitching and yawing of said fuel cell.

12. An aircraft fuel tank which comprises: a supporting structure having means thereon for attaching said fuel tank to an aircraft; a pair of expandable and contractible fuel cells on said supporting structure, said fuel cells each being expandable when fuel is delivered thereto, and contractible when fuel is transferred therefrom; means for delivering fuel into said fuel cells; and a motorized sling assembly on said supporting structure which comprises a motor; a main shaft interconnected to said motor which is rotatable in one direction when fuel is introduced into said fuel cells and rotatable in the opposite direction when said motor is intermittently energized; and slings which are connected to said shaft and which support said fuel cells, there being a group of slings for each fuel cell, said slings being rolled upon said shaft when said motor is energized to contract said fuel cells to reduce the volume thereof producing fuel cells which consistently function as full; said supporting structure including a pair of hinged clam shell doors which rest on said fuel cells when the fuel cells are expanded and enclose said fuel cells when the fuel cells are substantially empty.

13. An aircraft fuel tank which comprises: a supporting structure having means thereon for attaching said fuel tank to an aircraft; a pair of expandable and contractible fuel cells on said supporting structure, said fuel cells each being expandable when fuel is delivered thereto, and contractible when fuel is transferred therefrom; means for delivering fuel into said fuel cells; and a motorized sling assembly on said supporting structure which comprises a motor; a main shaft interconnected to said motor which is rotatable in one direction when fuel is introduced into said fuel cells and rotatable in the opposite direction when said motor is intermittently energized; and slings which are connected to said shaft and which support said fuel cells, there being a group of slings for each fuel cell, said slings being rolled upon said shaft when said motor is energized to contract said fuel cells to reduce the volume thereof producing fuel cells which consistently function as full; said motorized sling assembly embodying a motor shaft, a worm means, a worm gear firmly mounted on said main shaft and engaged by said worm means and a switch, said worm means being slidable on said motor shaft between a first position which effects closing said switch to energize said motor when fuel is being transferred from said fuel cells, and a second position in which the switch is open.

14. An aircraft fuel tank according to claim 13, wherein said worm means includes a compression spring which is loaded as the fuel cells are contracted and the worm means is forced to the second position and which urges the worm means to the first position as fuel is being transferred from the fuel cells.

15. An aircraft fuel tank which comprises: an elongated supporting structure releasably attached to an external surface portion of an aircraft with the longitudinal axis of said supporting structure generally aligned with the flight path direction of the aircraft; an elongated, expandable and contractible fuel cell on said supporting structure and having its longitudinal axis generally parallel to the longitudinal axis of said supporting structure, said fuel cell being expandable when fuel is introduced therein and contractible when fuel is withdrawn therefrom; and a motorized sling assembly on said supporting structure which comprises a motor; a shaft interconnected to said motor which is rotatable in one direction when fuel is introduced into said fuel cell and rotatable in the opposite direction when said motor is periodically energized; and slings which are connected to said shaft and which support said fuel cell, said slings being rolled upon said shaft when said motor is energized to contract said cell to reduce the volume thereof producing a fuel cell which consistently functions as full.

16. An aircraft fuel tank which comprises: an elongated supporting structure releasably attached to an external surface portion of an aircraft with the longitudinal axis of said supporting structure generally aligned with the flight path direction of the aircraft; a pair of elongated, expandable and contractible fuel cells on said supporting structure and having their longitudinal axes generally parallel to the longitudinal axis of said supporting structure, said fuel cells each being expandable when fuel is delivered thereto, and contractible when fuel is transferred therefrom; means for delivering fuel into said fuel cells; and a motorized sling assembly on said supporting structure which comprises a motor; a main shaft interconnected to said motor which is rotatable in one direction when fuel is introduced into said fuel cells and rotatable in the opposite direction when said motor is intermittently energized; and slings which are connected to said shaft and which support said fuel cells, there being a group of slings for each fuel cell, said slings being rolled upon said shaft when said motor is energized to contract said fuel cells to reduce the volume thereof producing fuel cells which consistently function as full.

17. An aircraft fuel tank which comprises: an elongated supporting structure releasably attached to an external surface portion of an aircraft with the longitudinal axis of said supporting structure generally aligned with the flight path direction of the aircraft; a pair of elongated, expandable and contractible fuel cells on said supporting structure and having their longitudinal axes generally parallel to the longitudinal axis of said supporting structure, said fuel cells each being expandable when fuel is introduced therein, and contractible when fuel is transferred therefrom; means for delivering fuel into said fuel cells; means for uniformly transferring fuel from said fuel cells; and a motorized sling assembly on said supporting structure which comprises a motor; a shaft interconnected to said motor which is rotatable in one direction when fuel is delivered to said fuel cells and rotatable in the opposite direction when said motor is intermittently energized; and slings which are connected to said shaft and which support said fuel cells, there being a group of slings for each fuel cell, said slings being rolled upon said shaft when said motor is energized to contract said fuel cells to reduce the volume thereof producing fuel cells which consistently function as full.

References Cited in the file of this patent

UNITED STATES PATENTS

| | | |
|---|---|---|
| 2,724,418 | Krupp | Nov. 22, 1955 |
| 2,853,259 | Underwood | Sept. 23, 1958 |

FOREIGN PATENTS

| | | |
|---|---|---|
| 116,812 | Great Britain | June 27, 1918 |
| 242,087 | Switzerland | Sept. 2, 1946 |